(12) United States Patent
Yamada et al.

(10) Patent No.: US 10,476,092 B2
(45) Date of Patent: Nov. 12, 2019

(54) FUEL CELL SYSTEM, FUEL CELL MOUNTABLE VEHICLE AND METHOD OF CONTROLLING FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Yoshiaki Naganuma, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 229 days.

(21) Appl. No.: 14/926,919

(22) Filed: Oct. 29, 2015

(65) Prior Publication Data

US 2016/0141679 A1    May 19, 2016

(30) Foreign Application Priority Data

Nov. 15, 2014 (JP) ................. 2014-232254

(51) Int. Cl.
*H01M 8/00* (2016.01)
*H01M 8/04746* (2016.01)
*H01M 8/04029* (2016.01)

(52) U.S. Cl.
CPC ... *H01M 8/04768* (2013.01); *H01M 8/04029* (2013.01); *H01M 2250/20* (2013.01)

(58) Field of Classification Search
CPC ......... H01M 8/04768; H01M 8/04358; H01M 8/0432; H01M 8/04029; H01M 2250/20; B60L 11/1892; Y02T 90/32
See application file for complete search history.

(56) References Cited

U.S. PATENT DOCUMENTS

| 2010/0035095 | A1 | 2/2010 | Taniguchi et al. |
| 2010/0167149 | A1 | 7/2010 | Ishikawa |
| 2011/0244349 | A1* | 10/2011 | Rainville .......... H01M 8/04029 429/429 |

(Continued)

FOREIGN PATENT DOCUMENTS

| CA | 2 641 201 A1 | 5/2008 |
| JP | H07-130388 A | 5/1995 |

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

A fuel cell system comprises: a fuel cell; a cooling liquid supply flow path for supplying cooling liquid to the fuel cell; a radiator for cooling the cooling liquid; a first temperature sensor, provided at an outlet of the radiator, for measuring a temperature of the cooling liquid; an ambient temperature sensor; and a controller. The controller executes: estimating a temperature of the cooling liquid inside the cooling liquid supply flow path based on an ambient temperature measured by the ambient temperature sensor; acquiring a temperature of the cooling liquid inside the cooling liquid supply flow path based on the temperature measured by the first temperature sensor after it is determined that the cooling liquid within the radiator has reached the first temperature sensor; and adjusting a flow rate of the cooling liquid based on the estimated temperature or the acquired temperature of the cooling liquid.

9 Claims, 5 Drawing Sheets

(56) References Cited

U.S. PATENT DOCUMENTS

2012/0015272 A1    1/2012  Naganuma et al.
2014/0156128 A1*   6/2014  Wake .................... B60L 1/003
                                                                701/22

FOREIGN PATENT DOCUMENTS

| | | |
|---|---|---|
| JP | 2006-164738 | 6/2006 |
| JP | 2006-172962 A | 6/2006 |
| JP | 2009-170378 | 7/2009 |
| JP | 2010-277704 | 12/2010 |

* cited by examiner

FUEL CELL SYSTEM, FUEL CELL MOUNTABLE VEHICLE AND METHOD OF CONTROLLING FUEL CELL SYSTEM

CROSS-REFERENCE TO RELATED APPLICATIONS

The present application claims priority from Japanese patent application No. 2014-232254 filed on Nov. 15, 2014, the disclosure of which is hereby incorporated by reference into this application in its entirety.

BACKGROUND

Field

The present Invention relates to a fuel cell system, a fuel cell mountable vehicle, and a method of controlling a fuel cell system.

Related Art

Fuel cells are usually cooled by cooling liquid, JP2006-184738A discloses an art for detecting an ambient temperature by a temperature sensor, and starting circulation of cooling liquid based on the detected ambient temperature.

While whether to start the circulation of the cooling liquid is determined by using the ambient temperature in JP2006-164738A, there is a difference among the ambient temperature, a temperature of cooling liquid which remains inside a radiator, and a temperature of cooling liquid which is supplied to the fuel cell. Therefore, there has been a problem that an accurate temperature of the cooling liquid cannot be grasped.

SUMMARY

The present invention is made in order to solve at least a part of the subject described above, and can be implemented in view of the following aspects.

(1) According to one aspect of the invention, there is provided A fuel cell system to be mounted on a fuel cell mountable vehicle. The fuel cell system comprises a fuel cell; a cooling liquid supply flow path for supplying cooling liquid to the fuel cell;
  a radiator for cooling the cooling liquid: a first temperature sensor, provided at an outlet of the radiator, for measuring a temperature of the cooling liquids an ambient temperature sensor; and a controller The controller executes: estimating a temperature of the cooling liquid inside the cooling liquid supply flow path based on an ambient temperature measured by the ambient temperature sensor; acquiring a temperature of the cooling liquid inside the cooling liquid supply flow path based on the temperature measured by the first temperature sensor after it is determined that the cooling liquid within the radiator has reached the first temperature sensor; and adjusting a flow rate of the cooling liquid based on the estimated temperature or the acquired temperature of the cooling liquid. According to this aspect, an accurate temperature of the cooling liquid can be grasped and the flow rate of the cooling liquid can be adjusted.

(2) The fuel cell system in accordance with the aspect before may further comprises: a cooling liquid pump provided at the cooling liquid supply flow patio a bypass tube for circulating the cooling liquid discharged from the fuel cell to the cooling liquid supply flow path at downstream of the radiator by bypassing the radiator; a flow split valve for splitting the flow of the cooling liquid discharged from the fuel cell to the radiator and the bypass tube; and a second temperature sensor, provided at an outlet of the fuel cell, for measuring a temperature of the cooling liquid. The controller may adjust the flow rate of the cooling liquid by controlling operation of the cooling liquid pump and a flow splitting ratio of the flow splitting valve between the radiator and the bypass tube, based on the temperature measured by the second temperature sensor, one of the estimated and acquired temperatures of the cooling liquid inside the radiator, and a target temperature of the fuel cell. According to this aspect, the flow splitting ratio can be controlled by accurately estimating the temperature of the cooling liquid inside the radiator more accurately.

(3) The fuel cell system in accordance with the aspect before, wherein it may be determined that the cooling liquid remaining inside the radiator has reached the first temperature sensor when the cooling liquid period completes flowing the cooling liquid by a total volume of a volume of the cooling liquid inside the radiator and a volume of the cooling liquid between the outlet of the radiator and a position at which the first temperature sensor is provided. According to this aspect, the timing at which the cooling liquid remaining inside the radiator reaches the first temperature sensor can easily be determined.

(4) The fuel cell system in accordance with the aspect before, wherein when the temperature sensor used by the controller to obtain the temperature of the cooling liquid inside the cooling liquid supply flow path is switched from the ambient temperature sensor to the first temperature sensor, if a difference between the estimated temperature of the cooling liquid and the acquired temperature by the first temperature sensor is equal to or more than a predetermined value before the switching, the controller may set an upper limit to a changing rate of an opening of the flow split valve. According to this aspect, the opening of the flew split valve is slowly changed, and undershoot and overshoot of the flow split valve can be suppressed.

Note that the present invention can be implemented in various forms. For example, the invention can be implemented in forms, other than a fuel cell system such as a fuel cell mountable vehicle and a method of controlling a fuel cell system.

DESCRIPTION OF THE EMBODIMENTS

First Embodiment

Figure 1:
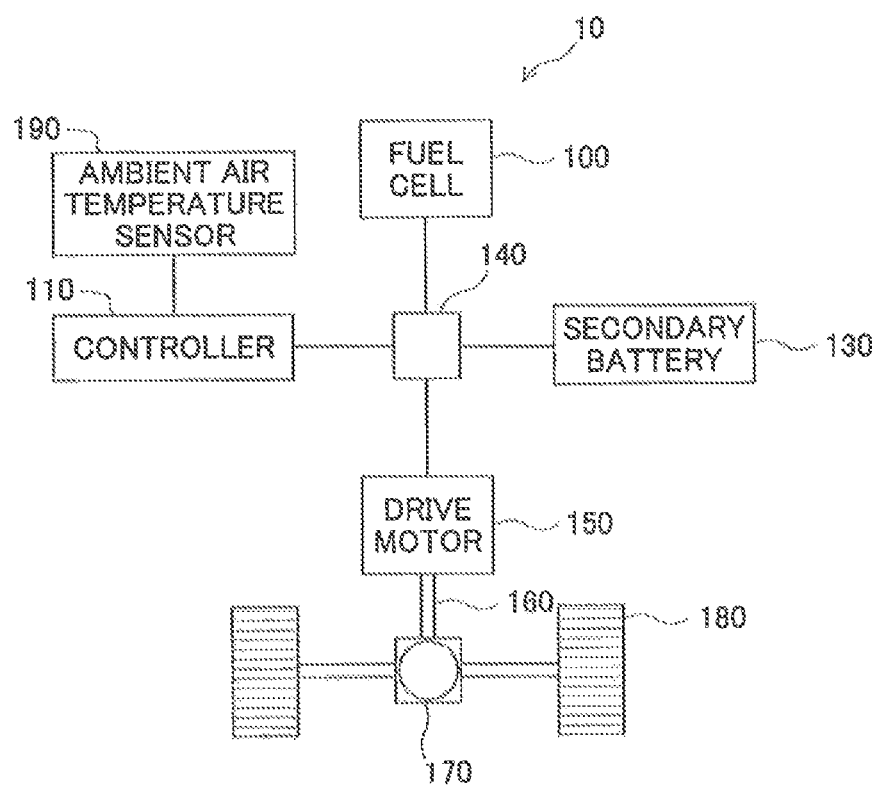
FIG. 1 is a view illustrating a fuel cell mountable vehicle on which a fuel cell is mounted.

FIG. 1 is a view illustrating a fuel cell mountable vehicle 10 on which a fuel cell is mounted (hereinafter, may simply be referred to as the "vehicle 10"). The vehicle 10 includes the fuel cell 100, a controller 110 (ECU: Electronic Control Unit), a secondary battery 130, an electric power distribution controller 140, a drive motor 150, a drive shaft 160, drive force distributing gears 170, left and right wheels 180, and an ambient temperature sensor 190.

The fuel cell 100 is an electric power generation device for retrieving electric power by electrochemically reacting fuel gas with oxidizing gas. The controller 110 controls operation of the fuel cell 100, the secondary battery 130, and the electric power distribution controller 140. The controller 110 uses the fuel cell 100 as a main drive force source of the vehicle 10: however, in a ease where the generated power of the fuel cell 100 is low, such as immediately after the vehicle 10 is started, the secondary battery 100 may be used as an electric power source for operating the vehicle 10. For example, a nickel hydride cell, a lithium ion cell may be adopted as the secondary battery 280. The secondary battery 130 may be charged directly by using electric power which is outputted from the fuel cell 100, or charged by recovering the kinetic energy of the vehicle 10 with the drive motor 150 when the vehicle 10 decelerates. Upon receiving an instruction from the controller 110, the electric power distribution controller 140 controls electric power which is outputted from the fuel cell 100 to the drive motor 150 and electric power which is outputted from the secondary battery 130 to the drive motor 150. Further, when the vehicle 10 decelerates, upon receiving an instruction from the controller 110, the electric power distribution controller 140 transfers the electric power regenerated by the drive motor 150 to the secondary battery 130. The drive motor 150 functions as an electric motor for operating the vehicle 10. When the vehicle 10 decelerates, the drive motor 150 functions as an electric power generator which recovers the kinetic energy of the vehicle 10 as electric energy. Further, the drive shaft 160 transfers the drive force produced by the drive motor 150, to the drive force distributing gears 170. The drive force distributing gears 170 distributes the drive force to the left and right wheels 180. The ambient temperature sensor 190 measures a temperature of ambient air.

Figure 2:
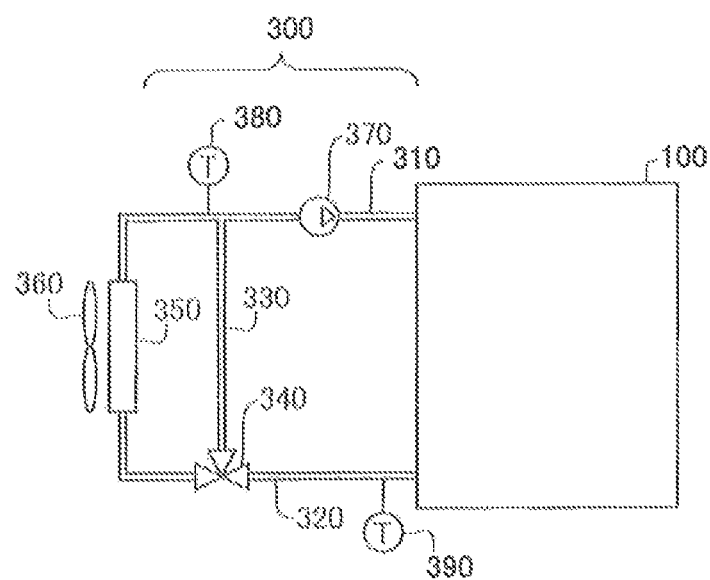
FIG. 2 is a view illustrating the fuel cell and a cooling subsystem of the fuel cell.

FIG. 2 is a view illustrating the fuel cell 100 and a cooling subsystem 300 of the fuel cell 100. A fuel cell system mounted on the vehicle 10 includes the cooling subsystem 300, an oxidizing gas supply-and-discharge subsystem, and a fuel gas supply-and-discharge subsystem. In this specification, among the subsystems, only thy cooling subsystem 300 is described, and description of the oxidizing gas supply-and-discharge subsystem and the fuel gas supply-and-discharge subsystem is omitted.

The cooling subsystem 300 includes a cooling liquid supply tube 310, a cooling liquid discharge tube 320, a bypass tube 330, a flow split valve 340, a radiator 350, a radiator fan 360 (hereinafter, may simply be referred to as the "fan 360"), a cooling liquid pump 370, and temperature sensors 380 and 330. In this embodiment, water is used as the cooling liquid. Therefore, the cooling liquid may be referred to as "cooling water," and the cooling liquid pump 370 may be referred to as the "cooling water pump 370" or the "water pump 370 (W/P)." In the drawings of this embodiment, the cooling liquid pump 370 is described as "W/P."

The cooling liquid is supplied from the cooling liquid supply tube 310 to the fuel cell 100, and is discharged to the cooling liquid discharge tube 320. The cooling liquid supply tube 310 corresponds to the cooling liquid supply flow path in the claims. The radiator 350 is connected with the cooling liquid supply tube 310 and the cooling liquid discharge tube 320. The cooling liquid discharge tube 320 and the cooling liquid supply tube 310 are connected with the bypass tube 330 which causes the cooling liquid to bypass the radiator 350 and circulates the cooling liquid to the cooling liquid supply tube 310. The flow split valve 340 is provided at a connecting portion of the cooling liquid discharge tube 320 and the bypass tube 330. The flow split valve 340 splits the flow to reach the cooling liquid to the radiator 350 and the bypass tube 330. The radiator 350 is provided with the radiator fan 360. The radiator fan 360 cools the cooling liquid flowing through the radiator 350, by blowing wind to the radiator 350. The cooling liquid pump 370 supplies the cooling liquid to the fuel cell 100. In FIG. 2, the cooling liquid pomp 370 is provided downstream of the radiator 350; however, the cooling liquid pump 370 may be provided upstream of the radiator 350. The first temperature sensor 380 is provided substantially at an outlet of the radiator 350, outside the radiator 350 (hereinafter, "substantially" may be omitted). The second temperature sensor 380 is provided substantially at a cooling liquid outlet of the fuel cell 100, outside the fuel cell 100 (hereinafter, "substantially" may be omitted) The first temperature sensor 380 measures a temperature of the cooling liquid to be supplied to the feel cell 100. The second temperature sensor 390 measures a temperature of the cooling liquid discharged from the fuel cell 100 (i.e., a temperature of the cooling liquid to be supplied to the radiator 350). The temperature of the cooling liquid discharged from the fuel cell 100 is substantially the same as that of the fuel cell 100. Note that since the cooling liquid is warmed up by the fuel cell 100, it may be used as a heat source for when an indoor air conditioner of the vehicle 10 is in a heater mode. Further, the cooling water may also be used as cooling liquid for an intercooler which is used for the fuel gas, in addition to the cooling liquid for the fuel cell 100. In this specification, description of the applications as the heat source and the cooling liquid for the intercooler is emitted.

In this embodiment, the cooling liquid is supplied from the cooling liquid supply tube 310 to the fuel cell 100 by the cooling liquid pump 370, flows through the fuel cell 100 while cooling the fuel cell 100, and then is discharged to the cooling liquid discharge tube 320. The cooling liquid is split to flow to the radiator 350 and the bypass tube 330 by the flow split valve 340. The cooling liquid split for the radiator 350 is cooled by the radiator 350, whereas the cooling liquid split for the bypass tube 330 is not cooled (hereinafter, the cooling liquid which does not pass through the radiator 350 due to the split is referred to as the "bypassing cooling liquid"). The controller 110 controls the temperature of the cooling liquid and, the cooling of the fuel cell 100 by adjusting a flow rate ratio (flow splitting ratio) between the cooling liquid which flows to the radiator 350 and the cooling liquid which flows to the bypass tube 330, a rotational speed of the radiator fan 360, and a flow rate at the cooling liquid pump 370.

Figure 3:
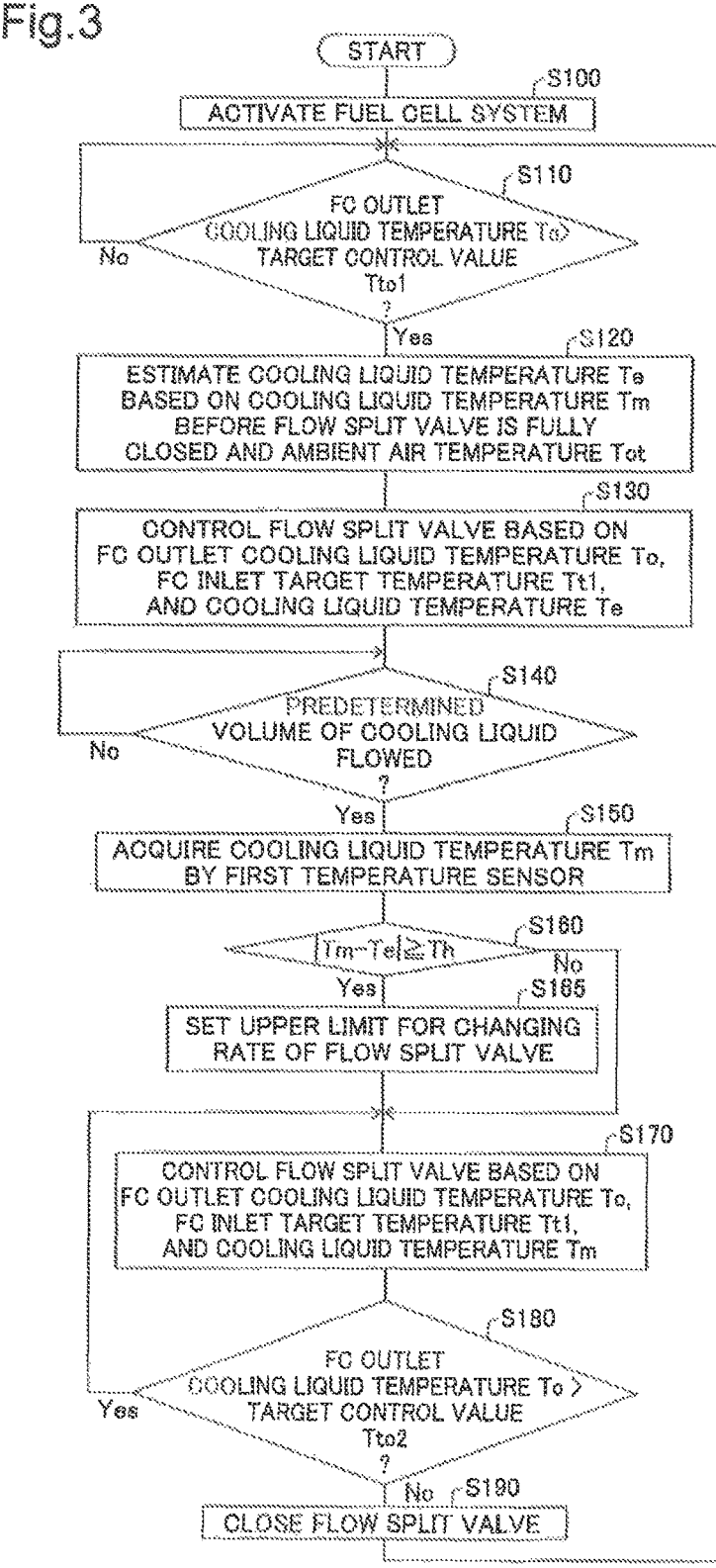
FIG. 3 is a flowchart of a control of the cooling subsystem of the fuel cell system, which starts when the cooling subsystem is activated.

FIG. 3 is a flowchart of a control of the cooling subsystem 300 of the fuel cell system, which starts when the cooling subsystem 300 is activated. The following parameters are used in processing of FIG. 3.

Tt1: A target control value of the cooling liquid temperature at an inlet of the fuel cell.

Tto1, Tto2: Target control values of the cooling liquid temperature at the outlet of the fuel cell.

To: The cooling liquid temperature at the outlet of the fuel cell (a measurement value of the second temperature sensor 390).

Tm: The cooling liquid temperature at the outlet of the radiator (a measurement value of the first temperature sensor 380).

Te: An estimation value of the cooling liquid temperature inside the radiator Urn estimation value of the cooling liquid temperature at the outlet of the radiator, inside the radiator).

·r: The flow splitting ratio at the flow split valve 340.

r=(the cooling liquid flow rate at the radiator)/(the cooling liquid flow rate at the radiator+the cooling liquid flow rate at the bypass tube).

Note that a sum of the cooling liquid flow rate at the radiator and the cooling liquid flow rate at the bypass tube corresponds to an entire flow rate at the cooling liquid pump 370.

At S100, the fuel cell system is activated, in a case where the fuel cell system is mounted on the vehicle 10, the activation is triggered by turning on a starter switch (not illustrated) for the vehicle 10. The controller 110 drives the radiator fan 360 and the cooling liquid pump 370. Note that immediately after the fuel cell system is activated, the flow splitting ratio r of the flow slit valve 340 is zero, and the entire cooling liquid discharged from the fuel cell 100 flows into the bypass tube 330, and the cooling liquid does not flow into the radiator 350. In this state, the radiator 350 does not release heat, and therefore, the temperature of the bypassing cooling liquid gradually increases. On the other hand, the temperature of the cooling liquid inside the radiator 350 is maintained lower than that of the bypassing cooling liquid. Note that, although the flow splitting ratio r is zero here, it may be other than zero, for example, in a case where the starter switch is turned off and then turned on again immediately, since the cooling water temperature is high.

At S110, the controller 110 measures the cooling liquid temperature To at the outlet of the fuel cell 100 by using the second temperature sensor 390, and determines whether the outlet cooling liquid temperature To is above the target control value Tto1 thereof. If To≤Tto1, the cooling liquid temperature To at the outlet of the fuel cell 100 is sufficiently low, and therefore, the controller 110 repeats S110, On the other hand, if Tto1<To, the controller 110 executes processing from S120 so as to cool the cooling liquid with the radiator 350.

At S120, the controller 110 estimates a current value of the cooling liquid temperature To inside the radiator 350, by using the cooling liquid temperature Tm at the outlet of the radiator 350 before the flow split valve 340 is hilly closed and the ambient temperature Tot. Here, the phrase "the flow split valve 340 is fully closed" means setting the flow splitting ratio r to zero at S190 described later, Note that when the routine at S120 to S190 in FIG. 3 is performed for the first time after the fuel cell system is activated, since "the cooling liquid temperature Tm at the outlet of the radiator 350 before the flow split valve 340 is fully closed" does not exist, at S120, the controller 110 estimates the cooling liquid temperature Te inside the radiator 350 as equivalent to the ambient temperature Tot. The processing contents of S120 after a routine from S120 to S190 is performed at least once (i.e., the routine is repeated) are described later.

At S130, the controller 110 calculates the opening r of the flow split valve 340 by using the cooling liquid temperature To at the outlet, of the fuel cell 100, the target control value Tt1 of the cooling liquid temperature at the inlet of the fuel cell 100, and the cooling liquid temperature Te inside the radiator 350. The following relationships are established among the above elements.

$$Tt1=(1-r) \times To + r \times Te \quad (1)$$

$$r=(Tt1-To)/(Te-To) \quad (2)$$

At S140, the controller 110 determines whether a total volume of the cooling liquid flowing into the radiator 350 is above a predetermined volume. The "total volume" may be a volume Vr of the cooling liquid inside the radiator 350 solely; or may be a sum of the volume Vr of the cooling liquid inside the radiator 350 and a volume of the cooling liquid between the outlet of the radiator 350 and the attached position of the first temperature sensor 380. Alternatively it may be a sum of the volume Vr of the cooling liquid inside the radiator 350 and a volume Vo of the cooling liquid inside the cooling liquid discharge tube 320 (the total volume of the volume Vr and the volume Vo). When such an amount of cooling liquid flows into the radiator 350, the cooling liquid inside the radiator 350 passes through the first temperature sensor 380, in other words, the cooling liquid cooled by the radiator 350 reaches the first temperature sensor 380. Therefore, a timing to change, from the estimated temperature Te to the actual measurement temperature Tm, the temperature which is used as the cooling liquid temperature inside the radiator 350 can easily be determined. If the total volume of the cooling liquid flowing into the radiator 350 is above the predetermined volume at S140, the controller 110 shifts to S150. The controller 110 may perform the determination at S140 based on time, instead of the flow rate of the cooling liquid. The controller 110 may determine that the total volume is above the predetermined volume if a predetermined period of time is determined as elapsed.

At S150, the controller 110 causes the first temperature sensor 380 to measure the cooling liquid temperature Tm. At S160, the controller 110 determines whether a difference between the actual measurement value Tm of the cooling liquid temperature measured by the first temperature sensor 380 and the estimation value Te of the cooling liquid temperature estimated at S120 is a predetermined value Th or above. If the difference |Tm−Te| is Th or above, at S165, the controller 110 sets an upper limit for a changing rate of the opening of the flow split valve 340, and then shifts to S170, On the other hand, if the difference |Tm−Te| is below Th, the controller 110 shifts directly from S160 to S170.

At S170, the controller 110 calculates the opening r of the flow split valve 340 based on the following equation by using the cooling liquid temperature To at the outlet of the fuel cell 100, the target control value Tt1 of the cooling liquid temperature at the inlet of the fuel cell 100, and the cooling liquid, temperature Tm measured at S150, Then the controller 110 changes the opening r.

$$r=(Tt1-To)/(Tm-To) \quad (3)$$

Note that, when the difference between the actual measurement valise Tm and the estimation value of the cooling liquid temperature is Th or above at S180, since the upper value of the changing rate of the opening of the flow split valve 340 is set, the flow splitting ratio r is changed slower than when the difference is below Th. Thus, occurrence of undershoot (reducing the opening excessively smaller than the target opening) and overshoot (increasing the opening excessively larger than the target opening) of the flow split valve 340 can be suppressed. Processing at S160 to S170 may be omitted. Note that when changing the cooling liquid temperature from the estimation value Te to the actual measurement value Tm, time constant processing may be executed so that the estimation value Te is gradually changed to the actual measurement value Tm. In other words, the estimation value Te may be slowly changed to the actual measurement value Tm by setting on upper limit to the change rate. Further, when gradually changing the estimation value Te to the actual measurement value Tm, the changing rate may be increased alter a predetermined period of time.

At S180, the controller 110 measures the cooling liquid temperature To discharged from the fuel cell 100 by using the second temperature sensor 390. The controller 110 determines whether the cooling liquid temperature To is below the target control value Tto2 of the cooling liquid temperature at the outlet of the fuel cell 100. The target control value Tto2 used at S180 may be the same as the target control value Tto1 used at S110; however, the target control value Tto2 is preferably below the target control value Tto1 so as to suppress hunting. Note that S180 may be omitted. Further, the cooling liquid temperature at the inlet of the fuel cell 100 may be used instead of the cooling liquid temperature at the outlet of the fuel cell 100. If the cooling liquid temperature Tb at the outlet of the fuel cell is below the target control value Tto2, the cooling of the cooling liquid by the radiator 350 is not required, and therefore, the controller 110 fully closes the flow split valve 340 (adjusts the flow splitting ratio r to sere) at S190. Thus, the cooling liquid does not flow into the radiator 350, and the temperature of the bypassing cooling liquid increases as a result. On the other hand, the cooling liquid remaining within the radiator 350 is cooled by ambient air, and therefore, the temperature of this cooling liquid decreases toward the ambient temperature. Further, the rate of the actual measurement value Tm gradually approaching the ambient temperature changes according to a vehicle speed.

After S190, the controller 110 shifts to S110 again to repeat the routine, and when the condition at S110 is satisfied, it shifts to S120. At S120 after the routine is repeated, the cooling liquid temperature Tm at the outlet of the radiator, which is measured by the first temperature sensor 380 before the flow split valve 340 is fully closed, is different from the ambient temperature Tot. A heat release rate Q of the radiator 350 is in proportion to (Tm·Tot)×(the flow rate of air in contact with the radiator). Therefore, the controller 110 can estimate a change of the cooling liquid temperature Te inside the radiator 350 by using the heat release rate Q, a heat volume carried by the cooling liquid, the volume of the cooling liquid inside the radiator 350, and the cooling liquid temperature Tm before the flew split valve 340 is fully closed. Normally, the cooling liquid temperature Te inside the radiator 350 gradually decreases from the cooling liquid temperature Tm at the outlet of the radiator, which is measured by the first temperature sensor 380 before the flow split valve 340 is fully closed, and the decreasing rate changes according to the vehicle speed. The cooling liquid temperature Te is used for setting the flow splitting ratio r based on Equation 2. At S130, the flow split valve 340 is opened again according to the flow splitting ratio r obtained as above. The description of the processing contents alter S130 is omitted since it is similar to that described above. Note that in this embodiment, S180 and S190 are executed; however, since the same determination as S110 is performed at S180, S180 and S190 may be omitted and S110 may be executed following S170. Further, the processing at S110 may be omitted.

In the above description, the control starting when the fuel cell system is activated is described as an example. Here, the second routine after returning to S110 and the routine thereafter are performed after an operating state of the vehicle becomes a normal state. Therefore, the processing in the flowchart of FIG. 3 is not limited to when the fuel cell system is activated.

According to the first embodiment, the controller 110 estimates the cooling liquid temperature Te inside the radiator 350 based on the ambient temperature sensor 190 when the fuel cell system is activated. Further, when the cooling liquid which remains inside the radiator 350 before the fuel cell system is activated reaches the first temperature sensor 380 after the fuel cell system is activated, the controller 110 acquires the cooling liquid temperature Tm by using the measurement value of the first temperature sensor 380. The controller 110 controls the flow splitting ratio r by using the cooling liquid temperature To at the outlet of the fuel cell 100, one of the estimated cooling liquid temperature Te inside the radiator and the measured cooling liquid temperature Tm, and the target temperature Tt1 of the fuel cell 100. As a result, even when the first temperature sensor 380 does not indicate an accurate cooling liquid temperature immediately after the flow split valve 340 is opened, the accurate cooling liquid temperature can be estimated or measured, and the flow split valve 340 can be controlled.

Second Embodiment

In the first embodiment described above, the controller 110 adjusts the flow splitting ratio r based on one of Equations 2 and 3. When the cooling liquid is flowed into the radiator 350, the temperature of the cooling liquid is reduced by being cooled, a viscosity of the cooling liquid increases, a pressure loss at the radiator 350 increases, and as a result, the set flow splitting ratio may be different from the actual flow splitting ratio. A small difference does not cause a problem; however, if the difference becomes excessively large, the cooling liquid amount assigned to the fuel cell 100 itself may be significantly different. Therefore, in the second embodiment, the flow splitting ratio r is corrected to cancel the difference by taking the viscosity of the cooling liquid into consideration.

Figure 4:
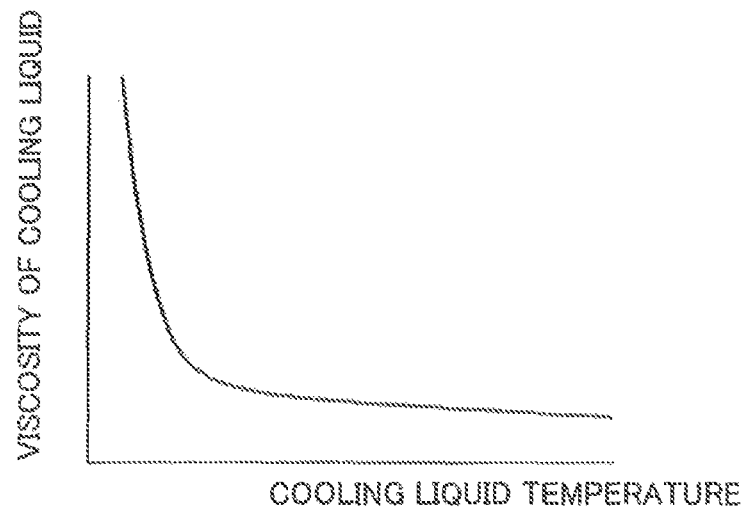
FIG. 4 is a chart illustrating a relationship between the cooling liquid temperature and the viscosity of the cooling liquid.

FIG. 4 is a chart illustrating a relationship between the cooling liquid temperature and the viscosity of the cooling liquid. When the temperature of the cooling liquid decreases, the viscosity of the cooling liquid increases. The controller 110 preferably corrects the flow splitting ratio r as follows. The controller 110 estimates the viscosity of the cooling liquid based on the cooling liquid temperature at the radiator 350. Further, the controller 110 estimates an increase amount of the pressure loss at the radiator 350 which is caused by the increase of the viscosity, and corrects the set value of the flow splitting ratio r based on the increase amount of the pressure loss. Note that the pressure loss of the cooling liquid pump 370 may change according to the flow rate of the cooling liquid, other than the viscosity of the cooling liquid. Therefore, the set value of the flow splitting ratio r may be corrected by using, net only the temperature and the viscosity, but also the flow rate of the cooling liquid and/or the rotational speed of the cooling liquid pump.

Figure 5:
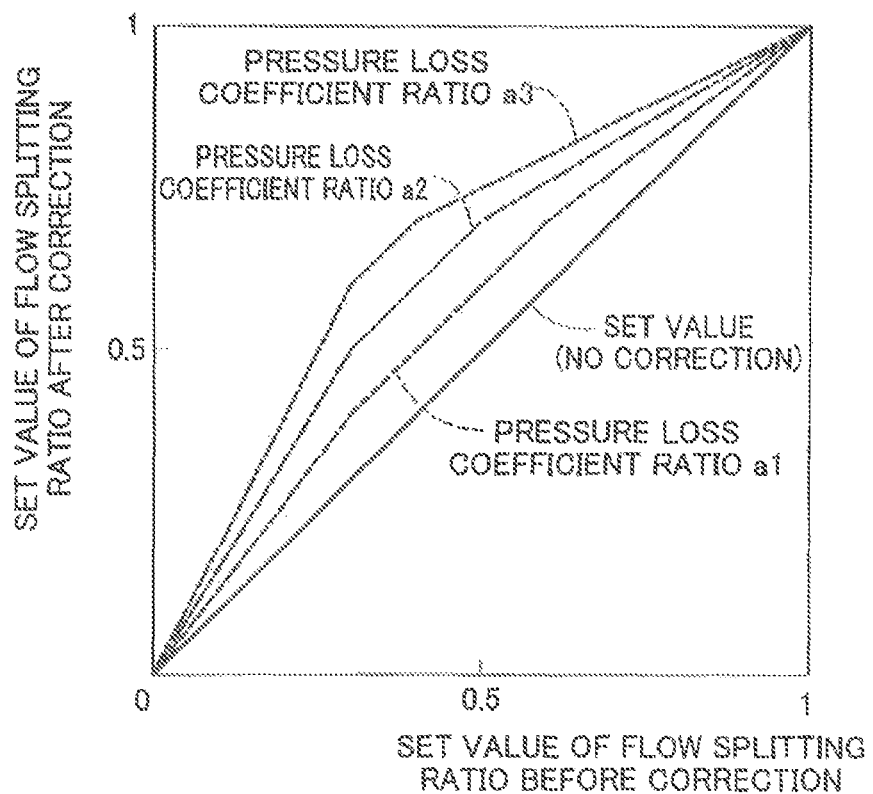
FIG. 5 is a view illustrating a relationship between the set values of the flow splitting ratio r before and after the correction.

FIG. 5 is a view illustrating a relationship between the set values of the flow splitting ratio r before and after the correction. In the second embodiment, based on a pressure loss coefficient ratio corresponding to the change of the viscosity, a fine adjustment of the set value of the flow splitting ratio r is performed. Here, the phrase "pressure loss coefficient ratio" means a relative value of a coefficient of the pressure loss within the radiator 350. In a case where the viscosity of the cooling liquid is comparatively low and the pressure loss coefficient ratio is comparatively small (e.g., when the pressure loss coefficient, ratio a1 is above one and close to one), the controller 110 can adjust the flow rate of the cooling liquid flowing through the radiator 350 to a desired value by slightly increasing the set value of the flow splitting ratio r. On the other hand, in a case where the viscosity of the cooling liquid is comparatively high and the pressure loss coefficient ratio is comparatively large (e.g., when it takes a value above a1, such as pressure less coefficients a2 and a3), the controller 110 can adjust the flow rate of the cooling liquid flowing through the radiator 350 to the desired value by correcting to increase the set value of the flow splitting ratio r according to the pressure loss coefficient ratio. Note that a largest value of the flow splitting ratio r is one (entire cooling liquid is flowed to the radiator 350), and a minimum value of the flow splitting ratio r is zero (entire cooling liquid is flowed to the bypass tube 330). A correction coefficient indicating the relationship indicating the set values of the flow splitting ratio r before and after the correction may be obtained from an experiment, for example.

According to the second embodiment, the set value of the flow splitting ratio r is corrected by taking into consideration that the viscosity of the cooling liquid flowing through the radiator 350 changes according to the temperature. Thus, the cooling liquid how rate at the radiator 350 can be adjusted to the desired value, and the fuel cell 100 can sufficiently be cooled. Note that the pressure loss of the cooling liquid pump 370 may also change according to the flow rate of the cooling liquid. Therefore, the set value of the flow splitting ratio r may be corrected by using, not only the temperature and the viscosity, but also the flow rate of the cooling liquid and the rotational speed of the cooling liquid pump.

Third Embodiment

Generally, with the fuel cell system, the controller 110 stops the rotation of the cooling liquid pump 370 once the generation of the electric power of the fuel cell is stopped. However, even if the electric power generation is stopped, hydrogen transmits an electrolyte film, reacts with oxygen, and causes heat. Therefore, in the third embodiment, the fuel cell 100 is cooled by taking the heat generation caused by such a cross leak into consideration.

Figure 6:
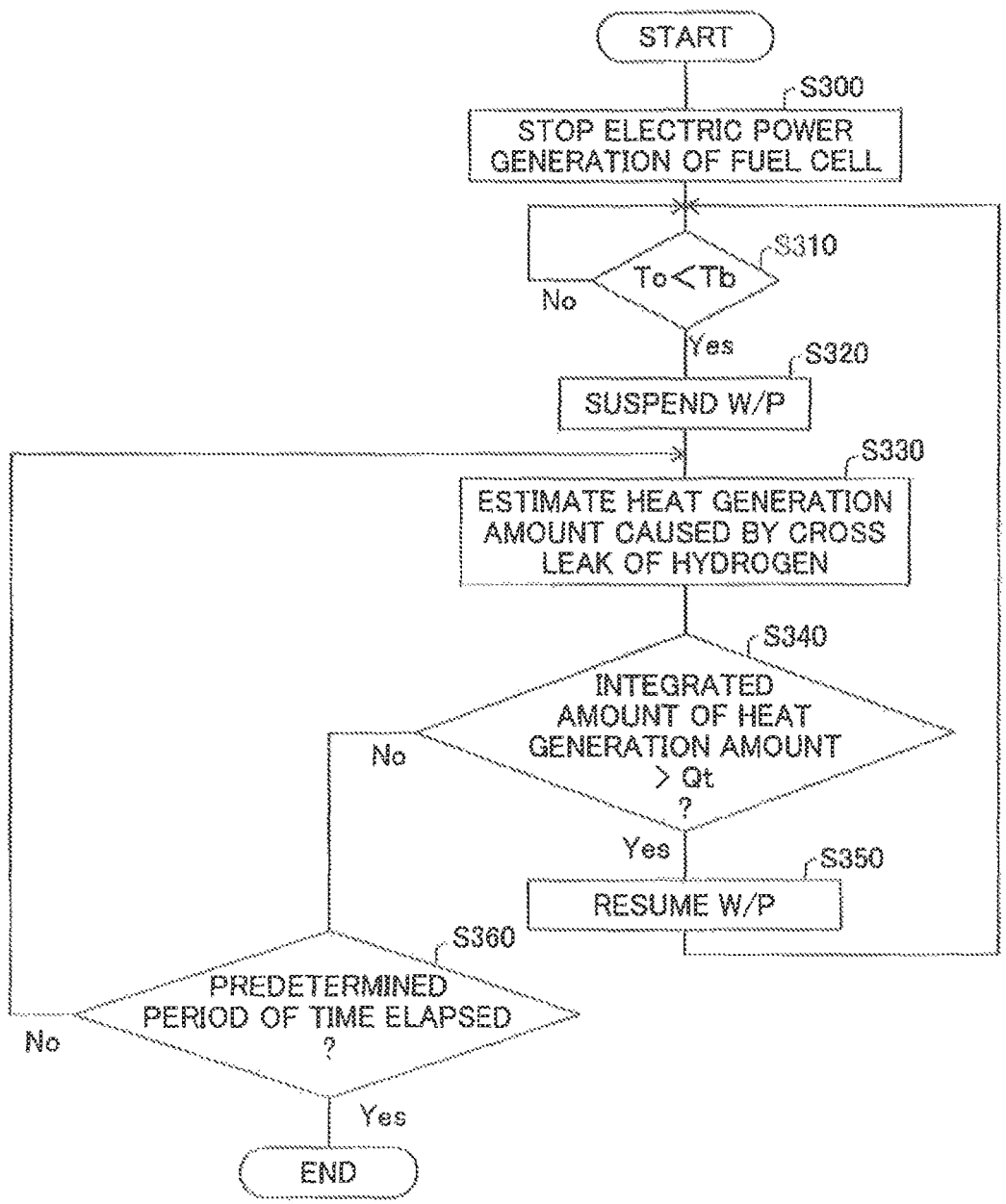
FIG. 6 is a control flowchart of the third embodiment.

FIG. 6 is a control flowchart of the third embodiment. At S300, the controller 110 stops the electric power generation of the bed cell 100. Note that the fuel cell 100 still carries heat which is generated before the electric power generation is stopped, and therefore, the cooling liquid pump 370 is continuously driven so as to cool the fuel cell 100.

At S310, the controller 110 measures the cooling liquid temperature To at the outlet of the fuel cell 100, and when the cooling liquid temperature To falls below a predetermined temperature Tb, the controller 110 shifts to S320 to suspend the cooling liquid pump 370. In the fuel cell 100, even when the electric power generation is stopped, heat is generated by hydrogen transmitting an electrolyte film and reacting with oxygen. At S330, the controller 110 estimates the cross leak amount of hydrogen and calculates the heat generation amount. The cross leak amount and the heat generation amount are preferably obtained by an experiment before use.

At S340, the controller 110 determines whether an integrated value of the heat generation amount is above a predetermined heat amount Qt. If the integrated value is above the predetermined heat amount Qt, the controller 110 shifts to S350 to resume the cooling liquid pump 370 and shifts to S310. Note that, the shifting from S350 to S310 is preferably performed, after the cooling liquid pump 370 flows the cooling liquid one of for a predetermined period of time and by a predetermined volume. By flowing the cooling liquid as above, even if the cooling liquid has temperature distribution, the temperature of the cooling liquid can be uniformed. If the integrated value of the heat generation amount is not above the predetermined, beat amount Qt, the controller shifts to S360 where the controller 110 determines whether a predetermined period of time has elapsed from the stop of the electric power generation. If the predetermined time period has not elapsed, the controller 110 shifts to S330. If the predetermined time period has elapsed, the controller 110 terminates the processing because if the predetermined time period has elapsed, it can be assumed that a further generation of heat by the cross leak of hydrogen will not occur.

According to the third embodiment, the controller 110 can sufficiently cool the fuel cell without measuring the temperature inside the fuel cell, even if the fuel cell generates heat by the cross leak of hydrogen.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

What is claimed is:

1. A fuel cell system to be mounted on a fuel cell mountable vehicle, comprising:
   a fuel cell;
   a cooling liquid supply flow path for supplying cooling liquid to the fuel cell;
   a cooling liquid pump provided at the cooling liquid supply flow path;
   a radiator for cooling the cooling liquid;
   a first temperature sensor, provided at an outlet of the radiator, for measuring a temperature of the cooling liquid;
   an ambient temperature sensor; and
   a controller, wherein the controller is programmed to execute:
      estimating a temperature of the cooling liquid inside the cooling liquid supply flow path based on an ambient temperature measured by the ambient temperature sensor;
      before it is determined that a predetermined volume of the cooling liquid has flowed into the radiator, controlling operation of the cooling liquid pump to adjust a flow rate of the cooling liquid flowing inside the cooling liquid supply flow path based on the estimated temperature;
      determining, based on the flow rate of the cooling liquid flowing inside the cooling liquid supply flow path via the operation of the cooling liquid pump, that the predetermined volume of the cooling liquid has flowed into the radiator;
      after the determination, acquiring a temperature of the cooling liquid inside the cooling liquid supply flow path based on the temperature measured by the first temperature sensor; and
      controlling the operation of the cooling liquid pump to adjust the flow rate of the cooling liquid flowing inside the cooling liquid supply flow path based on the acquired temperature of the cooling liquid.

2. The fuel cell system in accordance with claim 1, further comprising:
a bypass tube for circulating the cooling liquid discharged from the fuel cell to a section of the cooling liquid supply flow path located downstream of the radiator by bypassing the radiator;
a flow split Valve for splitting the flow of the cooling liquid discharged from the fuel cell to the radiator and the bypass tube; and
a second temperature sensor, provided at an outlet of the fuel cell, for measuring a temperature of the cooling liquid,
wherein the controller is programmed to adjust the flow rate of the cooling liquid by controlling the operation of the cooling liquid pump and a flow splitting ratio of the flow splitting valve between the radiator and the bypass tube, based on the temperature measured by the second temperature sensor, one of the estimated and acquired temperatures of the cooling liquid inside the radiator, and a target temperature of the fuel cell.

3. The fuel cell system in accordance with claim 2, wherein it is determined that the cooling liquid remaining inside the radiator has reached the first temperature sensor when the cooling liquid pump completes flowing the cooling liquid by a total volume of a volume of the cooling liquid inside the radiator and a volume of the cooling liquid between the outlet of the radiator and a position at which the first temperature sensor is provided.

4. The fuel cell system in accordance with claim 2, wherein when the temperature sensor used by the controller to obtain the temperature of the cooling liquid inside the cooling liquid supply flow path is switched from the ambient temperature sensor to the first temperature sensor, if a difference between the estimated temperature of the cooling liquid and the acquired temperature by the first temperature sensor is equal to or more than a predetermined value before the switching, the controller is programmed to set an upper limit to a changing rate of an opening of the flow split valve.

5. A fuel cell mountable vehicle, comprising the fuel cell system in accordance with claim 1.

6. A controller-executable method of controlling a fuel cell system including a fuel cell, a cooling liquid supply flow path for supplying cooling liquid to the fuel cell, a cooling liquid pump provided at the cooling liquid supply flow path, a radiator for cooling the cooling liquid, a first temperature sensor, provided at an outlet of the radiator, for measuring a temperature of the cooling liquid, and an ambient temperature sensor, the method comprising:
estimating a temperature of the cooling liquid inside the cooling liquid supply flow path based on an ambient temperature measured by the ambient temperature sensor;
before it is determined that a predetermined volume of the cooling liquid has flowed into the radiator, controlling operation of the cooling liquid pump to adjust a flow rate of the cooling liquid flowing inside the cooling liquid supply flow path based on the estimated temperature;
determining, based on the flow rate of the cooling liquid flowing inside the cooling liquid supply flow path via the operation of the cooling liquid pump, that the predetermined volume of the cooling liquid has flowed into the radiator;
after the determination, acquiring a temperature of the cooling liquid inside the cooling liquid supply flow path based on the temperature measured by the first temperature sensor; and
controlling the operation of the cooling liquid pump to adjust the flow rate of the cooling liquid flowing inside the cooling liquid supply flow path based on the acquired temperature of the cooling liquid.

7. The controller-executable method in accordance with claim 6, wherein the fuel cell mountable vehicle also includes:
a bypass tube for circulating the cooling liquid discharged from the fuel cell to a section of the cooling liquid supply flow path located downstream of the radiator by bypassing the radiator;
a flow split valve for splitting the flow of the cooling liquid discharged from the fuel cell to the radiator and the bypass tube; and
a second temperature sensor, provided at an outlet of the fuel cell, for measuring a temperature of the cooling liquid, and
the method further comprising adjusting the flow rate of the cooling liquid by controlling the operation of the cooling liquid pump and a flow splitting ratio of the flow splitting valve between the radiator and the bypass tube, based on the temperature measured by the second temperature sensor, one of the estimated and acquired temperatures of the cooling liquid inside the radiator, and a target temperature of the fuel cell.

8. The controller-executable method in accordance with claim 7, further comprising determining the flow of the cooling liquid remaining inside the radiator has reached the first temperature sensor when the cooling liquid pump completes flowing the cooling liquid by a total volume of a volume of the cooling liquid inside the radiator and a volume of the cooling liquid between the outlet of the radiator and a position at which the first temperature sensor is provided.

9. The controller-executable method in accordance with claim 7, further comprising setting an upper limit to a changing rate of an opening of the flow split valve, when the temperature sensor used by the controller to obtain the temperature of the cooling liquid inside the cooling liquid supply flow path is switched from the ambient temperature sensor to the first temperature sensor and if a difference between the estimated temperature of the cooling liquid and the acquired temperature by the first temperature sensor is equal to or more than a predetermined value before the switching.

* * * * *